(12) United States Patent
Russell et al.

(10) Patent No.: US 10,605,024 B2
(45) Date of Patent: Mar. 31, 2020

(54) SYSTEM USING FLOW VIBRATION DETECTION AND METHOD

(71) Applicants: Ronnie Russell, Cypress, TX (US); Keven O'Connor, Houston, TX (US); Ammar A. Munshi, Richmond, TX (US); Sean McMahon, Durham, NC (US)

(72) Inventors: Ronnie Russell, Cypress, TX (US); Keven O'Connor, Houston, TX (US); Ammar A. Munshi, Richmond, TX (US); Sean McMahon, Durham, NC (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 197 days.

(21) Appl. No.: 15/809,061

(22) Filed: Nov. 10, 2017

(65) Prior Publication Data
US 2019/0145207 A1 May 16, 2019

(51) Int. Cl.
*E21B 28/00* (2006.01)
*G01F 1/84* (2006.01)
(Continued)

(52) U.S. Cl.
CPC .............. *E21B 28/00* (2013.01); *E21B 47/00* (2013.01); *E21B 47/12* (2013.01); *G01F 1/8413* (2013.01);
(Continued)

(58) Field of Classification Search
CPC .......... E21B 47/14; E21B 28/00; E21B 34/08; E21B 23/06; E21B 43/10; E21B 31/005
See application file for complete search history.

(56) References Cited

U.S. PATENT DOCUMENTS 5,839,508 A 11/1998 Tubel et al.
6,624,759 B2 9/2003 Tubel et al.
(Continued)

FOREIGN PATENT DOCUMENTS

EP 0584998 A2 3/1994
EP 0749004 A1 12/1996
(Continued)

OTHER PUBLICATIONS

Science Direct Venturi-Tube—https://www.sciencedirect.com/topics/engineering/venturi-tube Accessed 2019 (Year: 2019).*
(Continued)

*Primary Examiner* — David Carroll
(74) *Attorney, Agent, or Firm* — Cantor Colburn LLP

(57) ABSTRACT

A system includes a tubular having an interior surface, a longitudinal axis, a flowbore, and a main portion having a first inner diameter. A vibration inducing feature is disposed along the interior surface of the tubular and is immovable with respect to the tubular, and has a second inner diameter within the tubular that is different than the first inner diameter. The feature has a beveled first end surface and a beveled second end surface, the beveled first and second end surfaces longitudinally displaced from each other. The feature is configured to increase turbulence within the flowbore and configured to dissuade a capture of objects passing therethrough. A sensing system includes a sensor arranged to detect vibration within flow passing the vibration inducing feature, and is configured to output a command signal in response to sensed data reaching a threshold value or indicative of a predetermined pattern.

18 Claims, 4 Drawing Sheets

(51) Int. Cl.
   *E21B 47/00*   (2012.01)
   *G05D 7/06*    (2006.01)
   *E21B 47/12*   (2012.01)
   *E21B 43/10*   (2006.01)
   *E21B 23/06*   (2006.01)
   *E21B 34/06*   (2006.01)
   *G01F 1/20*    (2006.01)

(52) U.S. Cl.
   CPC ......... *G01F 1/8468* (2013.01); *G05D 7/0623* (2013.01); *E21B 23/06* (2013.01); *E21B 34/06* (2013.01); *E21B 43/10* (2013.01); *G01F 1/20* (2013.01)

(56) References Cited

U.S. PATENT DOCUMENTS 9,683,427 B2   6/2017   Russell
2002/0189815 A1*  12/2002   Johnson ................ E21B 34/08
                                                        166/373
2010/0294508 A1   11/2010   Xu et al.
2011/0100112 A1*  5/2011    Du .......................... E21B 47/10
                                                        73/152.32
2015/0034386 A1*  2/2015    Reed ..................... E21B 17/006
                                                        175/48

FOREIGN PATENT DOCUMENTS

WO   WO8905974 A1      6/1989
WO   WO2011053714 A2   5/2011

OTHER PUBLICATIONS

International Search Report and Written Opinion for International Application No. PCT/US2018/054677; International Filing Date Oct. 5, 2018; Report dated Jan. 15, 2019 (pp. 1-9).

* cited by examiner

SYSTEM USING FLOW VIBRATION DETECTION AND METHOD

BACKGROUND

In the resource recovery industry, resources (such as hydrocarbons, steam, minerals, water, metals, etc.) are often recovered from boreholes in formations containing the targeted resource. A plethora of tools are used in such operations, many of them are actuated remotely. While early actuation configurations included mechanical connections, more recent configurations employ chemical, electrical and mechanical means as well as combinations thereof.

Alternatively, a signal is delivered from a remote location that is sensed, and the signal is then used to initiate the actuation of the tool. One remote signal delivery system employs an apparatus to generate a pulse coupled to the fluid in the string. The pulse is carried downhole to a tool having strain sensors and/or accelerometers therein capable of sensing the pulse or pulses as they reach the sensor. A sequence of pulses will be awaited by the tool prior to actuation. Upon sensing the sequence, the electronics package in the tool initiates an actuation of the tool.

The art would be receptive to alternative and improved devices and methods to initiate the actuation of tools in the resource recovery industry.

SUMMARY

A system includes a tubular having an interior surface, a longitudinal axis, a flowbore, and a main portion having a first inner diameter. A vibration inducing feature is disposed along the interior surface of the tubular and is immovable with respect to the tubular. The vibration inducing feature has a second inner diameter within the tubular, the second inner diameter different than the first inner diameter. The feature has a beveled first end surface and a beveled second end surface, the beveled first and second end surfaces longitudinally displaced from each other. The vibration inducing feature is configured to increase turbulence within the flowbore and configured to dissuade a capture of objects passing therethrough. A sensing system includes a sensor arranged to detect vibration within flow passing the vibration inducing feature, and is configured to output a command signal in response to sensed data reaching a threshold value or indicative of a predetermined pattern.

A system includes a tubular having an interior surface, a longitudinal axis, a flowbore, and a main portion having a first inner diameter. A vibration inducing feature is disposed along the interior surface of the tubular and immovable with respect to the tubular, the vibration inducing feature having a second inner diameter within the tubular, the second inner diameter different than the first inner diameter, the feature having a beveled first end surface and a beveled second end surface, the vibration inducing feature configured to dissuade a capture of objects passing therethrough. Vibration in flow through the flowbore at least doubles as a result of passing through the vibration inducing feature from an entry to an exit of the vibration inducing feature.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
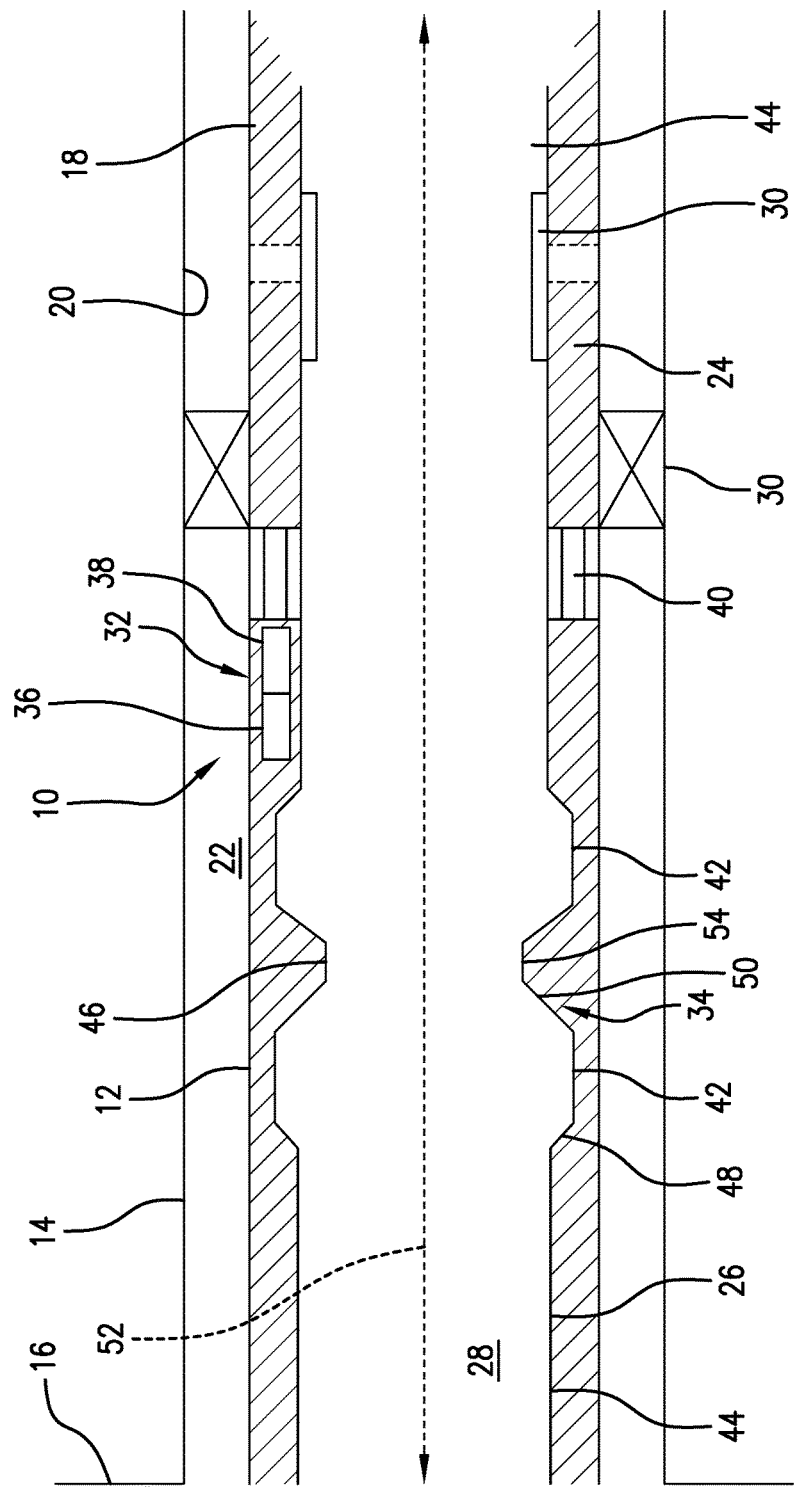
FIG. 1 depicts a schematic sectional view of an embodiment of a system for flow vibration detection.

Referring to FIG. 1, a system 10 is illustrated that can be used in, but is not limited to, the downhole industry. The system 10 includes a tubular 12. The tubular 12 may include a plurality of connected pipe segments. In the illustrated embodiment, the tubular 12 may be passed through an outer structure 14, such as, but not limited to, a borehole that extends from a surface location 16, an outer casing, or other outer tubular. In one embodiment, an exterior surface 18 of the tubular 12 may be separated from an interior surface 20 of the outer structure 14 to define a space, such as an annular space 22, therebetween. In another embodiment, the exterior surface 18 of the tubular 12 may abut the interior surface 20 of the outer structure 14 or may be gripped onto or sealed to the outer structure 14. The tubular 12 includes a wall 24 having an interior surface 26 having a tubular shape to define a flowbore 28 therethrough. The flowbore 28 includes a first inner diameter ID1 (see FIG. 2), and a majority of the tubular 12 may have the first inner diameter ID1 for conducting operations therethrough such as, but not limited to, production and/or injection of fluids and/or other materials, and passage of various tools, objects, or other tubulars therethrough. The system 10 may include one or more tools 30 to operate within an environment in which the system 10 is utilized. The tools 30 may include, but are not limited to, a remote set liner hanger, a settable packer, and an inflow control device. Operation of the one or more tools 30 of the system 10 may be controlled remotely through the use of a sensing system 32.

The sensing system 32 includes a vibration inducing feature 34, as will be further described below, and a sensor 36 to sense flow through the flowbore. The sensor 36 may include one or more accelerometers to detect the vibrations/ acoustic noise caused by the flow. However, the sensor 36 could alternatively, or additionally, use pressure transducers because the vibrations in the flow cause localized pressure fluctuations. Other alternative sensors 36 could also be used, such as, but not limited to, those that employ Doppler effect calculations. The sensor 36 may be at least partially disposed within a wall of the tubular 12. The sensing system 32 may further include a controller 38 that receives sensed data from the sensor 36. The controller 38 may include a memory for storing the sensed data, and may further store one or more threshold values or predetermined patterns. The controller 38 may further include programming to compare the sensed data to the threshold values or predetermined patterns for subsequent actions. Such subsequent actions could include sending a command signal, such as an actuation signal to a tool-actuating system 40 that will actuate one or more of the tools 30 in the system 10. The command signal may alternatively initiate or stop a timer located within the sensing system 32. The command signal may also, in other embodiments, be sent to the surface location 16 for further review and action.

The vibration inducing feature 34 is included in the sensing system 32 to intentionally at least partially induce vibrations in the flow through the flowbore 28, and may, in some embodiments render the flow through the flowbore 28 at least partially inconsistent, thereby increasing vibrations and turbulence at the vibration inducing feature 34 and altering a speed of flow through the tubular 12 as it passes the vibration inducing feature 34. The sensing system 32 is employed to detect the vibration/acoustic noise generated by fluid flow as it passes by the sensing system 32. As such, it is beneficial to generate as much vibration as possible at or within detection range of the location of the sensing system 32. In embodiments described herein, the vibration inducing feature 34 is a stationary member of the system 10, and does not include any moving parts that would move within the flowbore 28 or relative to the tubular 12. In the illustrated embodiments, the vibration inducing feature 34 is integrally formed within the wall 24 of the tubular 12.

Figure 2:
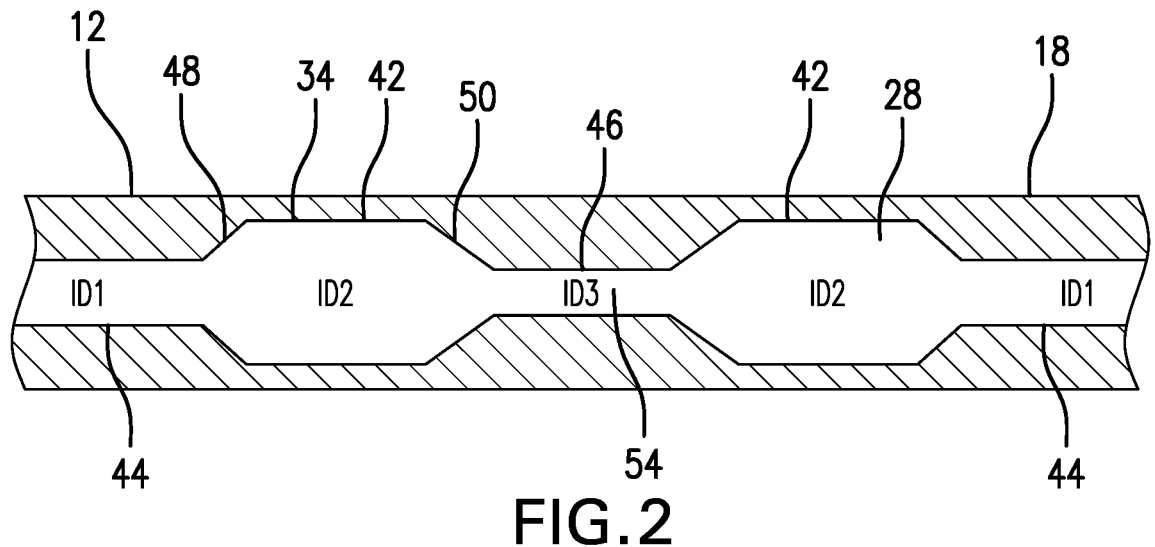
FIG. 2 depicts a schematic view of an embodiment of a vibration inducing feature for use in the system of FIG. 1.
Figure 4:
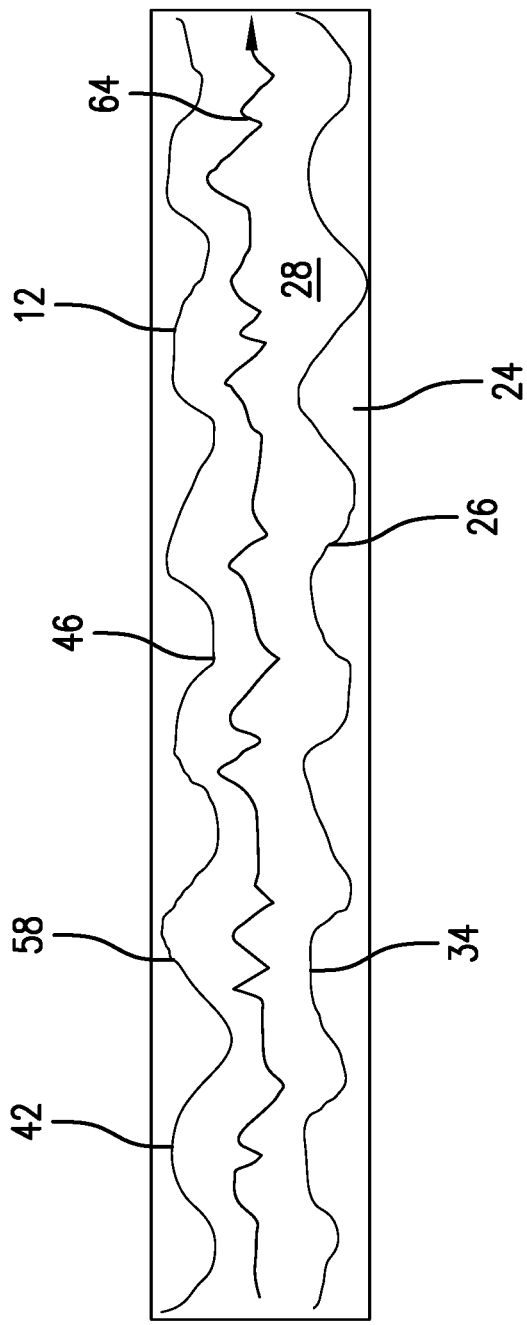
FIG. 4 depicts a schematic view of another embodiment of a vibration inducing feature for use in the system of FIG. 1; and, FIG. 5 depicts a schematic view of a cross-section of another embodiment of a vibration inducing feature for use in the system of FIG. 1.

One embodiment of the vibration inducing feature 34 is shown in FIGS. 1 and 2. Overbores 42, having a diameter greater than the first inner diameter ID1 of main portion 44 of the flowbore 28, are machined along the interior surface 26 of the tubular 12, such that innermost portions 46 of the interior surface 26 within the vibration inducing feature 34 are raised (protruding radially inwardly), relative to the overbores 42. These innermost portions 46 create additional turbulence as the flow passes by the vibration inducing feature 34 causing the fluid to bounce off the wall 24. The vibration/acoustic noise generated by fluid flow as it passes by the sensing system 32 is detected by the sensor 36. As such, it is beneficial to generate as much vibration as possible in the flow at the location of the sensor 36. Non-steady flow 64, which has been affected by a vibration inducing feature 34, is schematically depicted in FIG. 4. In embodiments described herein, the vibration inducing feature 34 provides relatively little if any restrictions in the flowbore 28 so that objects, such as balls, plugs, tools, and/or other tubulars may pass through the flowbore 28 without catching on the vibration inducing feature 34.

The overbores 42 have shallow bevels so that such objects that pass through the flowbore 28 do not get caught or damaged, in contrast to O-ring grooves that hold seals therein or locating features that are used to intentionally catch and retain dogs. Further, the overbores 42 are not merely a single change in inner diameter from one diameter to another, but multiple changes in inner diameter, including changes from smaller inner diameter to larger inner diameter to smaller inner diameter over a longitudinal span of the vibration inducing feature 34, where such changes are configured to increase turbulence within the tubular 12. The beveled first and second end surfaces 48, 50 are always less than 90° with respect to the longitudinal axis 52, and in more particular embodiments, the beveled first and second end surfaces 48, 50 extend at an angle between approximately 15° to approximately 30° with respect to the longitudinal axis 52. The overbores 42 can be machined with leading and trailing angles so that other tools and objects passing through the flowbore 28 will not get caught or stuck in the overbores 42, and easily pass through changing diameters. The beveled first and second end surfaces 48, 50 may also be curved with respect to the longitudinal axis 52. A shape of the one or more machined overbores 42 including the first and second end surfaces 48, 50 and a longitudinal section having a second inner diameter (ID2, as shown in FIG. 2), the longitudinal section extending between the first and second beveled end surfaces 48, 50 is utilized to dissuade the capture of objects moving past the overbores 42 and through the flowbore 28.

Compared to a tubular 12 where the inner diameter with a smooth bore is the same across its entire length, flow 64 passing through the vibration inducing feature 34 (from an entry to an exit of the vibration inducing feature 34) at least doubles due to the overbores 42, and embodiments of the overbores 42 described herein may contribute to 1000% or more increase in vibration in the flow 64. As the flow 64 is going through the flowbore 28, anytime the inner diameter increases, the flow 64 wants to move to the larger inner diameter. So any increase will cause some sort of turbulence. So the system 10 is configured to achieve sufficient turbulence to get a signal that is required for a desired subsequent action to occur. While a single overbore 42 affects vibration as compared to a smooth bore, employing two or more overbores 42 in series within the vibration inducing feature 34 has even greater impact on the detectable vibration within the tubular 12 at the sensor 36. Adding multiple overbores 42 in series prevents the fluid flow through the flowbore 28 from achieving a steady state flow.

In one embodiment of the vibration inducing feature 34, and with reference to FIG. 2, the entry and exit inner diameter of the main portion 44 is denoted as ID1, the overbore inner diameter is denoted as ID2, and the inner diameter of the junction portion 54 in between each pair of adjacent overbores 42 is denoted as ID3 and is smaller than both ID1 and ID2, such that, ID2>ID1>ID3, as shown in FIG. 2, which provides for greater turbulence. Although, in an alternative embodiment, the inner diameter ID3 of the junction portions 54 between each pair of adjacent overbores 42 may be the same as the entry and exit diameter ID1. In embodiments described herein, the overbore inner diameter ID2, in order to contribute to sufficient increase in vibration, is at least 20% greater in diameter than the entry diameter ID1 of the main portion 44. That is, ID2>=ID1*1.2. While greater overbore inner diameters may increase the benefits of the vibration effects, the thickness of the wall 24 of the tubular 12 should be maintained at a minimum thickness in order to maintain pressure ratings for certain conditions. When multiple overbores 42 are employed, each overbore does not need to be equal in diameter or length.

Figure 3:
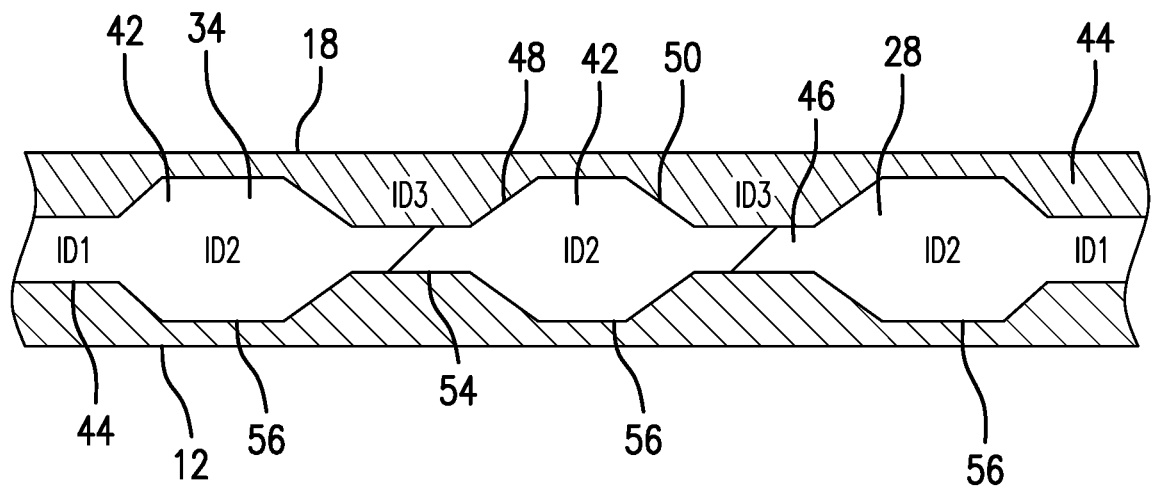
FIG. 3 depicts a schematic view of another embodiment of a vibration inducing feature for use in the system of FIG. 1.

With reference now to FIG. 3, to further increase vibration within the tubular 12, multiple pipe segments 56 of overbores 42 can be used. To simplify the machining process, each pipe segment 56 is formed initially as a separate part, with all segments 56 subsequently put together using tool string connections. This enables the employment of junction portion 54 with smaller inner diameter ID3 in between each overbore 42 while the entry and exit main portions 44 can still be formed with slightly larger inner diameter ID1.

Turning now to FIG. 4, in other or additional embodiments of the vibration inducing feature 34, multiple overbores 42 that increase the relative roughness of the interior surface 26 of the tubular 12 may include tighter bores/ridges or even a helical profile 58, however the helical profile 58 must be configured such that vibrations are induced in the flow 64 and, further in some embodiments, made to be inconsistent. For example, if the pitch of an indented helical profile on the interior surface 26 of the tubular 12 is formed such that the flow through the flowbore 28 tends to follow the path of the helical profile, then the output downstream of the vibration inducing feature 34 may become consistent and rotational, which could actually cause the tubular 12 to torque, which would be undesirable. Thus, any profile of the vibration inducing feature 34 must be configured to cause the flow through the flowbore 28 to go over the innermost portions 46, rather than following a helical path of the profile 58, so as to have a higher frequency vibration that could be used as a signal by the sensing system 32. Thus, the vibration inducing feature 34, if including a helical profile 58, is configured with a pitch angle and depth and width of the threads of the profile 58 that takes into account the diameter of the flowbore 28 for ensuring vibration induction in the flow with substantially no rotational effects.

Figure 5:
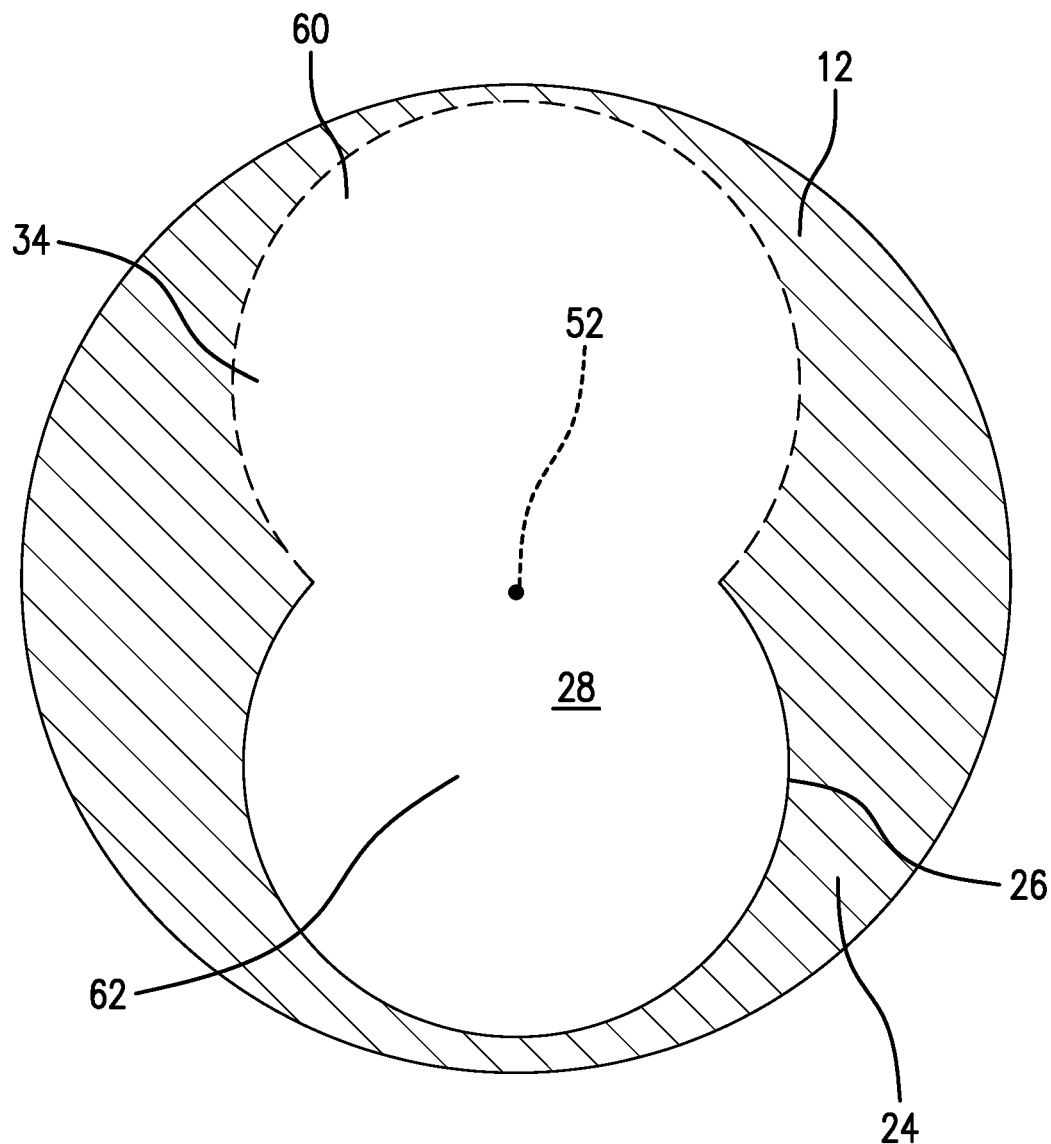

Another or additional embodiment of an alternative vibration inducing feature 34 is shown in FIG. 5 with eccentric overbores 60, 62 machined eccentric from each other and the longitudinal axis 52. This creates a flow profile that forces the fluid to alternate between two sides of the wall 24, increasing the vibration amplitude perpendicular to the flow axis. The sensor(s) 36 in the sensing system 32 may be configured to look for a specific excitation axis. The eccentric bores 60, 62 may be provided with different longitudinal lengths, and, as in the embodiment shown in FIG. 2, may be configured with beveled end surfaces 48, 50. The main portion 44 would also appear as in FIG. 2, with the main portion 44 concentric along the longitudinal axis 52.

Induced vibration in the system 10 may also advantageously be used beyond communication signals, such as in wellbore intervention, where vibration may be used to loosen or release stuck fish. Vibration may also be induced during cement jobs or gravel packs, to serve as a shaker that helps to evenly distribute the depositing material. Downhole vibration is typically desirably reduced, such as for protecting tools 30 from damage, and achieved through devices, such as dampeners and consistent diameters. The system 10 instead intentionally increases vibration amplitudes to assist in producing activation signals. Advantageously, there are no moving parts in the vibration inducing feature 34 that is being used to increase the vibration of flow 64 in the flowbore 28, which has a significant positive effect on reliability of the design for repeated and long term use.

In a method of operating the system 10, flow 64 (inclusive of any flowable material) is introduced into the tubular 12 of the system 10 and becomes unstable, as the flow 64 will tend to search for the wall 24 and the overbores 42 formed therein, and vibrations are created in the flow 64. The sensing system 32 senses vibration, and when the sensed data from the sensor 36 reaches a threshold value or is indicative of a particular pattern, the sensing system 32 will send a command signal to the tool 30 or perform another action, such as starting a timer or sending a signal to surface. In an embodiment of the system 10, the controller 38 of the sensing system 32 is an onboard analyzer which determines if the threshold value is met or if a predetermined pattern has been detected, and then the controller 38 initiates the next action, which can be communicating with something else such as the tool 30, or triggering another action or device, or performing some other function, such as, but not limited to, activating a memory logging command and setting a timer. Prior to use, the system 10 and its vibration inducing feature 34 can be tested to determine what levels of vibrations will be detectable when flow is introduced at certain pressures, and thus the threshold values and predetermined patterns can be assigned in the controller 38, and the flow can be introduced to meet the threshold value and/or predetermined pattern, so that the command signal or other action from the sensing system 32 is delivered or accomplished when desired by introduction of flow at the particular pressure.

Set forth below are some embodiments of the foregoing disclosure:

Embodiment 1

A system including: a tubular having an interior surface, a longitudinal axis, a flowbore, and a main portion having a first inner diameter; a vibration inducing feature disposed along the interior surface of the tubular and immovable with respect to the tubular, the vibration inducing feature having a second inner diameter within the tubular, the second inner diameter different than the first inner diameter, the feature having a beveled first end surface and a beveled second end surface, the beveled first and second end surfaces longitudinally displaced from each other, the vibration inducing feature configured to increase turbulence within the flowbore and configured to dissuade a capture of objects passing therethrough; and a sensing system including a sensor arranged to detect vibration within flow passing the vibration inducing feature, the sensing system configured to output a command signal in response to sensed data reaching a threshold value or indicative of a predetermined pattern.

Embodiment 2

The system as in any prior embodiment or combination of embodiments, further including a tool, wherein the command signal is an actuation signal to initiate actuation of the tool.

Embodiment 3

The system as in any prior embodiment or combination of embodiments, wherein the tool includes at least one of a liner hanger, a packer, and a flow control device.

Embodiment 4

The system as in any prior embodiment or combination of embodiments, wherein the second inner diameter is greater than the first inner diameter.

Embodiment 5

The system as in any prior embodiment or combination of embodiments, wherein the second inner diameter is at least 20 percent greater than the first inner diameter.

Embodiment 6

The system as in any prior embodiment or combination of embodiments, wherein the vibration inducing feature includes a plurality of overbores separated from each other by a junction portion of the flowbore, the junction portion having a third inner diameter different than the second inner diameter.

Embodiment 7

The system as in any prior embodiment or combination of embodiments, wherein the second inner diameter is greater than the first inner diameter, and the first inner diameter is greater than the third inner diameter.

Embodiment 8

The system as in any prior embodiment or combination of embodiments, wherein the tubular includes two or more pipe segments not integrally formed with each other, each segment having a connection, each connection having the third inner diameter.

Embodiment 9

The system as in any prior embodiment or combination of embodiments, wherein the vibration inducing feature includes one or more overbores eccentrically arranged with respect to the longitudinal axis.

Embodiment 10

The system as in any prior embodiment or combination of embodiments, wherein the beveled first end surface and the beveled second end surface are arranged at an angle less than 90 degrees with respect to the longitudinal axis.

Embodiment 11

The system as in any prior embodiment or combination of embodiments, wherein the angle is less than approximately 30 degrees.

Embodiment 12

The system as in any prior embodiment or combination of embodiments, wherein the sensor is an accelerometer and/or a pressure transducer at least partially disposed within a wall of the tubular.

Embodiment 13

The system as in any prior embodiment or combination of embodiments, wherein the vibration inducing feature includes one or more machined overbores.

Embodiment 14

A method of increasing and utilizing flow vibrations in the tubular of the system as in any prior embodiment or combination of embodiments, the method including: disposing the tubular within an outer structure; passing flow through the flowbore, the flow increasing in turbulence from the main portion as it passes the vibration inducing feature; detecting vibrations in the flow that passes the vibration inducing feature using the sensor system; comparing the sensed data of the flow with the threshold value or the predetermined pattern; and, outputting the command signal from the sensor system in response to the sensed data reaching the threshold value or indicative of the predetermined pattern.

Embodiment 15

The method as in any prior embodiment or combination of embodiments, wherein the vibration inducing feature includes one or more overbores machined in a wall of the tubular.

Embodiment 16

The method as in any prior embodiment or combination of embodiments, wherein disposing the tubular within an outer structure including disposing the tubular within a borehole.

Embodiment 17

The method as in any prior embodiment or combination of embodiments, wherein outputting the command signal includes sending an actuation signal to a tool of the system.

Embodiment 18

The method as in any prior embodiment or combination of embodiments, wherein the tool includes a liner hanger, a packer, and/or a flow control device.

Embodiment 19

The method as in any prior embodiment or combination of embodiments, wherein outputting the command signal includes starting a timer and/or storing the sensed data.

Embodiment 20

A system including: a tubular having an interior surface, a longitudinal axis, a flowbore, and a main portion having a first inner diameter; and, a vibration inducing feature disposed along the interior surface of the tubular and immovable with respect to the tubular, the vibration inducing feature having a second inner diameter within the tubular, the second inner diameter different than the first inner diameter, the feature having a beveled first end surface and a beveled second end surface, the vibration inducing feature configured to dissuade a capture of objects passing therethrough; wherein vibration in flow through the flowbore at least doubles as a result of passing through the vibration inducing feature from an entry to an exit of the vibration inducing feature.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A system comprising:
    a tubular having an interior surface, a longitudinal axis, a flowbore, and a main portion having a first inner diameter;
    a vibration inducing feature disposed along the interior surface of the tubular and being immovable with respect to the tubular, the vibration inducing feature having a second inner diameter within the tubular, the second inner diameter defining at least one overbore having a diameter that is greater than the first inner diameter, the vibration inducing feature having a beveled first end surface and a beveled second end surface, the beveled first and second end surfaces being longitudinally displaced from each other, the vibration inducing feature increasing turbulence within the flowbore and dissuading a capture of objects passing therethrough; and
    a sensing system including a sensor arranged to detect vibration within flow passing through the at least one overbore of the vibration inducing feature, the sensing system being configured to output a command signal in response to sensed data reaching a threshold value or indicative of a predetermined pattern.

2. The system of claim 1, further comprising a tool, wherein the command signal is an actuation signal to initiate actuation of the tool.

3. The system of claim 2, wherein the tool includes at least one of a liner hanger, a packer, and a flow control device.

4. The system of claim 1, wherein the second inner diameter is at least 20 percent greater than the first inner diameter.

5. The system of claim 1, wherein the at least one overbore includes a plurality of overbores separated from each other by a junction portion of the flowbore, the junction portion having a third inner diameter different than the second inner diameter.

6. The system of claim 5, wherein the second inner diameter is greater than the first inner diameter, and the first inner diameter is greater than the third inner diameter.

7. The system of claim 6, wherein the tubular includes two or more pipe segments not integrally formed with each other, each segment having a connection, each connection having the third inner diameter.

8. The system of claim 1, wherein the at least one overbore is eccentrically arranged with respect to the longitudinal axis.

9. The system of claim 1, wherein the beveled first end surface and the beveled second end surface are arranged at an angle less than 90 degrees with respect to the longitudinal axis.

10. The system of claim 9, wherein the angle is less than approximately 30 degrees.

11. The system of claim 1, wherein the sensor is an accelerometer and/or a pressure transducer at least partially disposed within a wall of the tubular.

12. The system of claim 1, wherein the at least one overbore includes one or more machined overbores.

13. A method of increasing and utilizing flow vibrations in the tubular of the system of claim 1, the method comprising:
    disposing the tubular within an outer structure;
    passing flow through the flowbore, the flow increasing in turbulence from the main portion as it passes the vibration inducing feature;
    detecting vibrations in the flow that passes the vibration inducing feature using the sensing system;
    comparing the sensed data of the flow with the threshold value or the predetermined pattern; and,
    outputting the command signal from the sensing system in response to the sensed data reaching the threshold value or indicative of the predetermined pattern.

14. The method of claim 13, wherein disposing the tubular within an outer structure including disposing the tubular within a borehole.

15. The method of claim 13, wherein outputting the command signal includes sending an actuation signal to a tool of the system.

16. The method of claim 15, wherein the tool includes a liner hanger, a packer, and/or a flow control device.

17. The method of claim 13, wherein outputting the command signal includes starting a timer and/or storing the sensed data.

18. A system comprising:
    a tubular having an interior surface, a longitudinal axis, a flowbore, and a main portion having a first inner diameter; and
    a vibration inducing feature disposed along the interior surface of the tubular and immovable with respect to the tubular, the vibration inducing feature having a second inner diameter within the tubular, the second inner diameter defines at least one overbore having a diameter that is greater than the first inner diameter, the vibration inducing feature having a beveled first end surface and a beveled second end surface, the vibration inducing feature configured to dissuade a capture of objects passing therethrough;
    wherein the vibration inducing feature acts on flow through the flow bore to at least double vibration in flow passing through the at least one overbore.

* * * * *